US012655664B2

(12) United States Patent
McBurney

(10) Patent No.: US 12,655,664 B2
(45) Date of Patent: Jun. 16, 2026

(54) GATE HINGE BRACKET ASSEMBLY

(71) Applicant: Chris McBurney, New Castle, KY (US)

(72) Inventor: Chris McBurney, New Castle, KY (US)

(*) Notice: Subject to any disclaimer, the term of this patent is extended or adjusted under 35 U.S.C. 154(b) by 11 days.

(21) Appl. No.: 18/780,458

(22) Filed: Jul. 22, 2024

(65) Prior Publication Data

US 2025/0027349 A1 Jan. 23, 2025

Related U.S. Application Data

(63) Continuation-in-part of application No. 17/539,176, filed on Nov. 30, 2021, now abandoned.

(60) Provisional application No. 63/119,627, filed on Nov. 30, 2020.

(51) Int. Cl.
*E05D 3/02* (2006.01)
*E05D 5/06* (2006.01)

(52) U.S. Cl.
CPC ................. *E05D 3/02* (2013.01); *E05D 5/06* (2013.01); *E05D 2003/027* (2013.01); *E05Y 2900/40* (2013.01)

(58) Field of Classification Search
CPC ................ E05D 3/02; E05D 2003/025; E05D 2003/027; E05D 5/04; E05D 5/06; E05D 5/08
USPC .......................................... 16/252, 253, 86.1
See application file for complete search history.

(56) References Cited

U.S. PATENT DOCUMENTS

| | | | | | |
|---|---|---|---|---|---|
| 189,866 | A * | 4/1877 | Long | E05D 3/02 | 16/389 |
| 504,451 | A * | 9/1893 | Lamb | E05D 7/0027 | 16/248 |
| 511,050 | A * | 12/1893 | Irwin | E05D 5/0246 | 16/252 |
| 527,685 | A * | 10/1894 | Haege | E05D 7/0407 | 16/240 |
| 792,240 | A * | 6/1905 | Shelton | E05D 5/02 | 16/253 |
| 1,188,302 | A * | 6/1916 | Mohns | E05D 5/02 | 16/253 |
| 1,224,036 | A * | 4/1917 | Sutton | E05D 3/12 | 16/366 |

(Continued)

*Primary Examiner* — Jeffrey O'Brien
(74) *Attorney, Agent, or Firm* — CARRITHERS LAW OFFICE, PLLC; David W. Carrithers

(57) ABSTRACT

A gate hinge bracket assembly for pivotally mounting a gate having longitudinal horizontal members and a leg frame member to a vertical support such as a post. A pair of U-shaped brackets, each one having opposing side flanges, receive a horizontal bar with the vertical leg frame member disposed therebetween adjacent the inner surface of the U-shaped bracket. A pair of spaced apart aligned vertical bracket sleeves are welded on the outer surface of the bracket opposite the opposing side flanges. Each gate hinge bracket assembly includes a threaded tee rod with a pair of nuts and washers for securing the rod to a post. The threaded tee rod includes a proximate end including a vertical tee rod sleeve alignable for cooperative engagement mounting between the bracket sleeves. A fastener is inserted through the bracket sleeves and vertical tee rod sleeve pivotally connecting and supporting the gate to the post.

13 Claims, 3 Drawing Sheets

(56) References Cited

U.S. PATENT DOCUMENTS

| | | | | | |
|---|---|---|---|---|---|
| 1,232,048 | A * | 7/1917 | Kolkmeier | E05D 5/02 16/253 |
| 1,469,425 | A | 10/1923 | Mehanna | |
| 1,793,013 | A | 2/1931 | Robertson | |
| 2,970,799 | A | 2/1961 | Abraham | |
| 3,107,390 | A * | 10/1963 | Shelton | E06B 11/04 248/219.3 |
| D204,872 | S * | 5/1966 | Davis | D8/323 |
| 3,295,158 | A * | 1/1967 | Hotchkiss, Jr. | E06B 11/04 403/164 |
| 3,304,656 | A | 2/1967 | Dvorak | |
| 3,514,807 | A * | 6/1970 | Lee | E05D 5/02 16/253 |
| 4,079,481 | A | 3/1978 | Cacidedo | |
| 4,590,642 | A * | 5/1986 | Hesener | E04F 10/0674 16/241 |
| 5,020,190 | A * | 6/1991 | Muegerl | E05D 3/02 16/253 |
| 5,035,084 | A | 7/1991 | Towns | |
| 5,042,198 | A * | 8/1991 | Privratsky | A01K 1/0005 49/248 |
| 5,167,049 | A * | 12/1992 | Gibbs | E05D 5/0215 16/253 |
| 5,199,218 | A * | 4/1993 | McQuade | E05D 5/06 16/390 |
| 6,073,396 | A * | 6/2000 | Kietzmann | E06B 11/04 16/237 |
| 6,176,043 | B1 * | 1/2001 | Gibbs | E06B 11/04 52/223.6 |
| 6,802,106 | B2 * | 10/2004 | Taglianetti | E05D 7/0045 16/268 |
| 7,240,400 | B2 * | 7/2007 | Bonham | E05D 5/06 16/389 |
| 8,375,517 | B1 * | 2/2013 | Johnsen | E05D 11/04 16/244 |
| 8,413,300 | B1 * | 4/2013 | Luneborg | E05D 5/128 16/253 |
| 8,800,110 | B1 * | 8/2014 | Stephenson | E05D 7/0423 16/245 |
| 2003/0014838 | A1 * | 1/2003 | deOliveira | E05D 3/02 16/233 |
| 2008/0222842 | A1 * | 9/2008 | Faber | E05D 5/06 16/86.1 |
| 2012/0090136 | A1 * | 4/2012 | Fields | E05D 7/1044 16/386 |
| 2022/0195767 | A1 * | 6/2022 | McBurney | E06B 11/022 |

* cited by examiner

GATE HINGE BRACKET ASSEMBLY

REFERENCE TO RELATED APPLICATIONS

This is a Continuation In Part application claiming priority from pending U.S. application Ser. No. 17/539,176 filed on Nov. 30, 2021 which claimed priority from U.S. Provisional Application Ser. No. 63/119,627 filed on Nov. 30, 2020 both of which are incorporated by reference herein.

TECHNICAL FIELD

The present invention relates to the field of gate hinges for use on bar gates.

BACKGROUND OF THE INVENTION

Gate hinges have been in use for hundreds of years. Gates historically have been made of steel or aluminum slats or pipes, wooden slats or other longitudinal members nailed or bolted together with vertical support members forming a rectangular frame and therefore tend to be quite heavy. A wooden gate that is typically twelve to sixteen feet long and which is four and one half feet tall can weigh more than one hundred pounds. Such a gate causes a great deal of strain on a post and on the hinges which must support the weight of the post plus the stresses put on the gate when swinging open and closed.

Typical farm gate hinge and pin assemblies and some garden or yard gate hinges include a looped member defining a sleeve which is fastened to an outside surface of a vertical post or frame member of the gate, usually the outer vertical leg of the gate. A threaded hinge j-bolt having an upturned stud extending from the post at a right angle from the stud is received by the gate sleeve or loop. Such gates are generally fitted with a top and bottom hinge, but in the case of a very heavy gate, three or more hinge and hinge assemblies may be required.

The most stressful position for that portion of a gate hinge which is directly connected to the post is that in which the gate is wide open. As shown in prior art FIG. 2 1, the gate includes a pair of clamp members having short sleeves attached to an outer leg vertical support member of the gate wherein the sleeves are pulling sideways against the threaded hinge pin. As time goes on, the hinge pins will either get bent under the severe load, the hinge pins will rotate or twist within the post causing the gate to sag, or the holes in the post in which the hinge pins are threaded will become expanded and the threaded hinge pins will become loose in the holes. In either event, the gate will sag and may even fall to the ground.

Several references teach methods of preventing sagging of a gate pivotally attached to a post. U.S. Pat. No. 8,800,110 for GATE HINGE by Stephenson which issued on Aug. 12, 2014 teaches a hinge including an L-bolt which is threaded and held within a plate by a nut on either side of the plate and wherein the plate has holes through which lag bolts are driven into the wooden post. U.S. Pat. No. 1,188,302 for GATE HINGE by Mohns which issued on May 20, 1916 teaches an L-bolt cast with a plate with screw holes and a threaded rod which pierces and is threaded into the wooden post, after which a bracket is attached to either side of the plate by hooks and is then bolted around the fence post.

A gate usually swings on a pair of spaced apart aligned hinge pins comprising either an integral hinge pin formed having a threaded shank with a stud extending therefrom at a 90 degree angle typically referred to as a J-bolt, or an L-shaped pin having a comprising a threaded rod cooperatively engaging a pair of nuts and/or washer and having a stud extending therefrom at a 90 degree angle for cooperative engagement of a mounting bracket or adapter having a vertical oriented sleeve extending from the outer vertical leg of a gate.

The hinge pin may be mounted to a support member such as a post by drilling a horizontal hole in the post and screwing the J-bolt therein or inserting the distal end of the L-shaped threaded rod thorough the post and tightening a proximate and distal nut to the post as shown in FIG. 1. A horizontal sleeve extending from the vertical frame end post of a gate is mounted onto a stud of the j-bolt with the sleeve supported by a circumferential lip or shoulder formed above the 90 degree elbow of the stud.

Because the weight of the gate pulls on the top hinge and pin, it tends to pull from the post and over time twisting the clamp holding the sleeve to the vertical gate end member until it becomes loose so that the hinge pin rotates and the sleeve supporting the gate slips off of the top pin. The hinge usually consists of a clamp fitting around a vertical support member of a gate having a crimped portion forming a loop opposite the distal ends which are bolted together around the vertical support member as shown in FIG. 2.

SUMMARY OF THE INVENTION

An improved gate hinge bracket assembly is provided for pivotally mounting a gate having longitudinal horizontal members and a leg frame member to a vertical support such as a post. The improve gate hinge bracket assembly comprises or consists of a pair of U-shaped brackets each one having opposing side flanges receive a horizontal member such as a pipe, bar, slat, or tubular member with the vertical leg frame member disposed therebetween adjacent the inner surface of the U-shaped bracket. The opposing side flanges of the U-shaped bracket include a plurality of spaced apart aligned apertures for insertion of screws, rivets, bolts or other fasteners surrounding the horizontal bar and vertical leg member for attachment thereto. A pair of spaced apart aligned vertical bracket sleeves are affixed to the outer surface of the bracket by welding or formed thereon opposite the opposing side flanges. Each gate hinge bracket assembly includes a threaded tee rod with a pair of nuts and washers for securing the rod to a post. The threaded tee rod includes a proximate end including a vertical tee rod sleeve formed thereon or welded thereon alignable for cooperative engagement mounting between the bracket sleeves. A vertical pin or bolt is inserted through the bracket sleeves and vertical tee rod sleeve pivotally connecting and supporting the gate to the post. Each gate is supported by an upper and lower gate hinge bracket assembly and optionally one or more additional bracket assemblies can be utilized therebetween for extremely heavy gates.

One preferred embodiment consists of a gate hinge bracket assembly for mounting a gate such as a pipe gate, rod gate or slat gate to a wooden post or other vertical supporting structure. The gate hinge bracket assembly includes a threaded tee rod including nut and washer on a distal end and a sleeve affixed to a proximate end for cooperative engagement with a pair of spaced apart sleeves vertically aligned with one another extending from the outer surface of a mounting bracket formed from a U-shaped bracket having opposing side flanges having apertures aligned for insertion of bolts for attachment to a vertical leg frame member and horizontal bar of a gate allowing pivoting of the gate with respect to the threaded tee rod extending from a vertical support member such as a gate post. As shown in the attached figures, the threaded shank or bolt portion of the threaded tee rod is rotatably inserted into a horizontal axial through-hole drilled in the vertical wooden gate post or a steel or concreted post.

In accordance with the present invention, there is provided a gate hinge bracket assembly comprising, consisting of, or consisting essentially of a sleeve member attaching to a distal end of a threaded tee rod. The threaded tee rod includes a long-threaded leg about eight to twelve inches long and a short sleeve affixed perpendicular thereto which is oriented vertically upon mounting. The molded or formed mounting U-shaped bracket comprises a opposing side flanges spaced apart a sufficient distance to cooperatively engage a vertical leg member disposed therebetween and has a plurality of spaced apart apertures formed therein or drilled therein.

The U-shaped bracket is formed by bending the integral sheet of material comprising the flanges in a parabolic curve in the center forming a U-shaped bracket so that the apertures formed therein are in opposing alignment and the ends of the bracket form spaced apart aligned flanges opposing one another for receiving both a portion of a horizontal longitudinal member joined to a portion of a vertical leg member of a gate frame.

The U-shaped bracket includes a pair of spaced apart vertically aligned sleeves affixed to an outer surface of the U-shaped bracket by welding, molding or other means. The flanges are spaced apart a selected distance sized for cooperatively engaging a tubular member sized to approximate the thickness of a vertical leg member and or horizontal member of a gate which would cooperatively be disposed therebetween. A preferred embodiment includes flanges having a pair of opposing spaced apart bottom apertures, a pair of opposing spaced apart center apertures, and a pair of opposing top apertures disposed near the bent portion of the bracket. The width of the mounting bracket is sized so that a horizontal bar of the gate will be aligned between the bottom and center apertures and the top, center, and bottom apertures are aligned adjacent to the outer vertical gate leg. Fastening means such as carriage bolts are used to fasten the opposing flanges together around the tubular members.

Mounting the gate to the post simply requires aligning the sleeves of the gate hinge bracket assembly with the threaded tee rod sleeve and inserting a bolt thorough the cooperatively engaging sleeves to hold the mounting bracket to the post. As shown in the figures, the threaded shank of the threaded tee rod is rotatably inserted into a horizontal axial through-hole drilled in the vertical wooden gate post or formed in a steel or a concreted post.

It is an object of this invention to provide a U-shaped bracket assembly removably attaching to both a horizontal member and a vertical end member of a gate.

It is an object of the present invention to provide a hinge bolt or bolt or vertical holding member for insertion into the U-shaped bracket sleeves and threaded bolt sleeve disposed therebetween having a flared top end and corresponding flared bolt head for providing a self-adjusting holding member.

It is an object of the present invention to form the U-shaped bracket with side flanges from a single sheet of material having a wider center section and tapered end sections to provide at least three bolts in vertical alignment holding a vertical gate frame end post biased against an inner end wall of the U-shaped bracket and to include a pair of bolts extending over the top and bottom of a horizontal gate member securing the U-shaped bracket securely to a gate.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DETAILED DESCRIPTION OF THE PREFERRED EMBODIMENT

Figure 1:
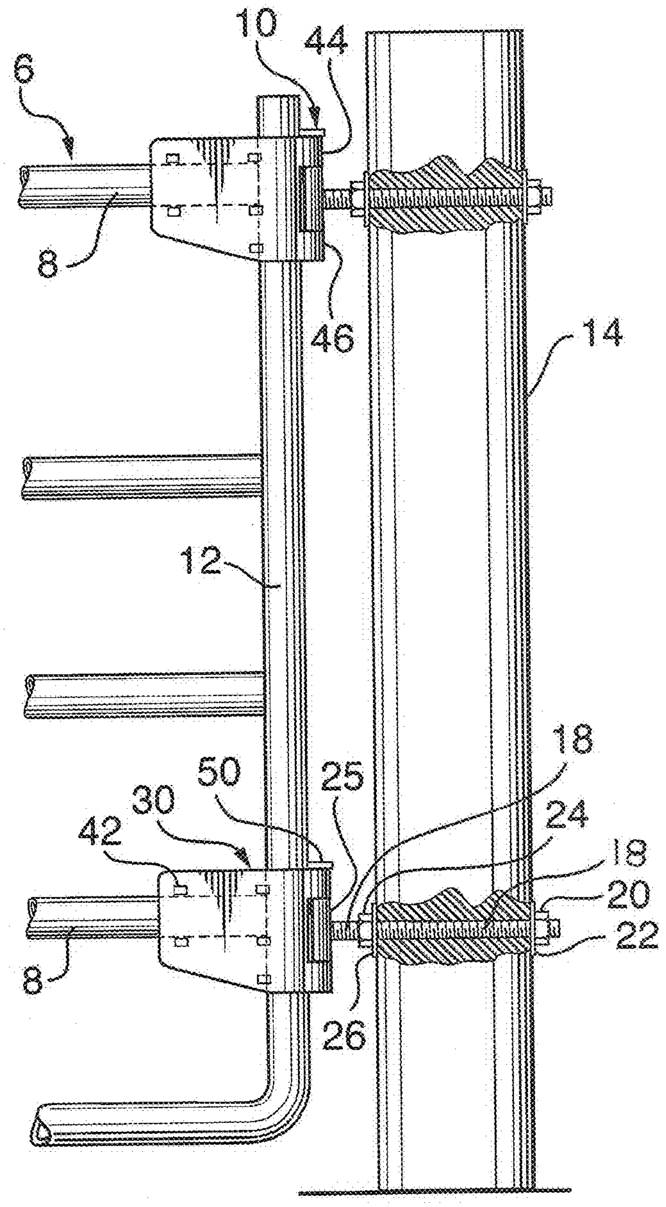
FIG. 1 is a perspective view of a pair of spaced apart U-shaped bracket assemblies of the present invention affixed to a top and bottom of a gate pivotally supported by threaded tee rods attached to a gate post.
Figure 2:
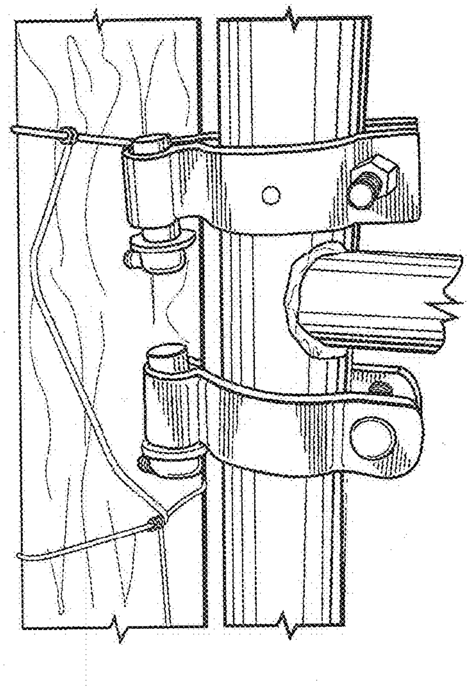
FIG. 2 PRIOR ART
FIG. 2 is a perspective view of a prior art conventional gate mounting bracket showing the conventional hinge pins rotating in the bores of a post resulting in sagging of the gate.
Figure 3:
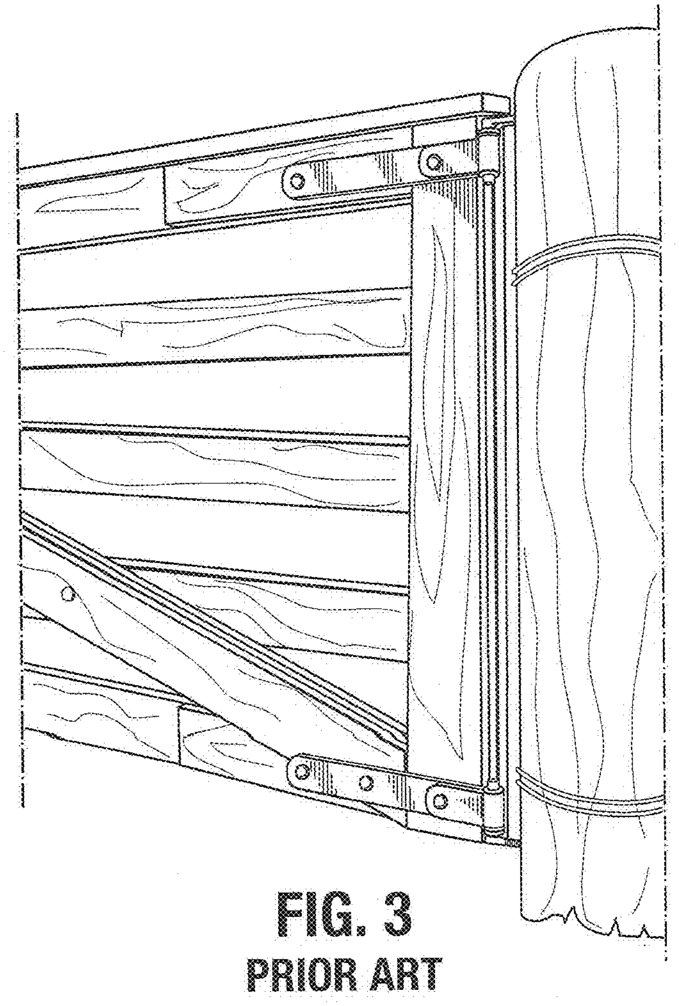
FIG. 3 PRIOR ART
FIG. 3 is a perspective view of a prior art conventional hinge strap affixed to a gate pivotally mounting on a j-bolt extending from a post.
Figure 4:
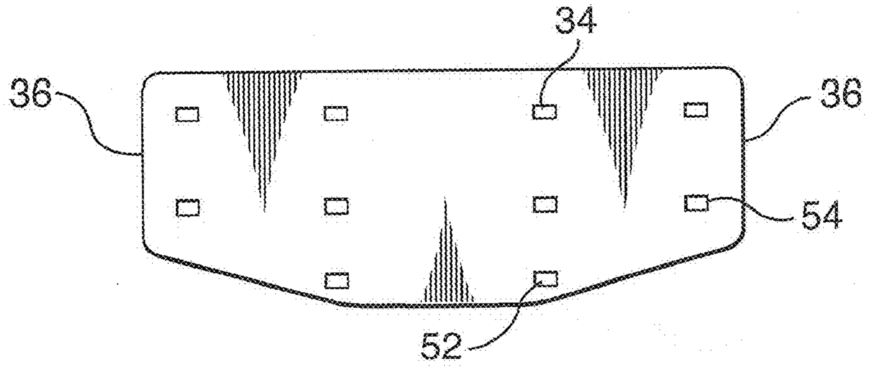
FIG. 4 is a plan view of the sheet of material for forming a U-shaped bracket having flanges with spaced apart apertures therein at selected positions prior to bending the distal ends together forming spaced apart side flanges having aligned apertures.

For the purposes of promoting an understanding of the principles of the invention, reference will now be made to the embodiment illustrated in the drawings and specific language will be used to described the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The terminology used herein is for the purpose of describing particular example embodiments only and is not intended to be limiting. As used herein, the singular forms “a,” “an,” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "about" can be reasonably appreciated by a person skilled in the art to denote somewhat above or somewhat below the stated numerical value, to within a range of ±10%.

The information included in this section, data or specifications, including any references cited herein and any description or discussion thereof, is included for exemplary purpose only and is not to be regarded as subject matter by which the scope of the invention as defined in the claims appended hereto is to be bound.

The following text sets forth a broad description of numerous different embodiments of present disclosure. The description is to be constructed as exemplary only and does not describes every possible embodiment since describing every possible embodiment would be impractical if not impossible. It will be understood that any feature, characteristic, component, composition, ingredient, product, step or methodology described herein can be deleted, combined with or substituted for, in whole or part, any other feature, characteristic, composition, ingredient, product, step or methodology described herein. Numerous alternative embodiments could be implemented, using either current technology or technology developed after the disclosure date of the invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Gates 6 are fabricated from steel, wood, or aluminum or a combination thereof and have a plurality of horizontal slats, pipes, tubes or other longitudinal horizontal members 8 nailed or bolted together with spaced apart aligned vertical support members forming a rectangular frame having a vertical frame leg member 12.

As shown in FIGS. 1 and 4-8, the present invention comprises, consists of, and/or consists essentially of a gate hinge bracket assembly 10 which are preferably used in a top and bottom combination aligned in order to resist sagging of a gate 6 extending from the bracket and hinge assembly. The U-shaped bracket assembly 10 and gate 12 are typically supported by a post 14 or other vertical structure having axial throughbore 16 to insert a threaded tee rod 18 for securing the U-shaped bracket(s) 10 to the post 14.

Figure 5:
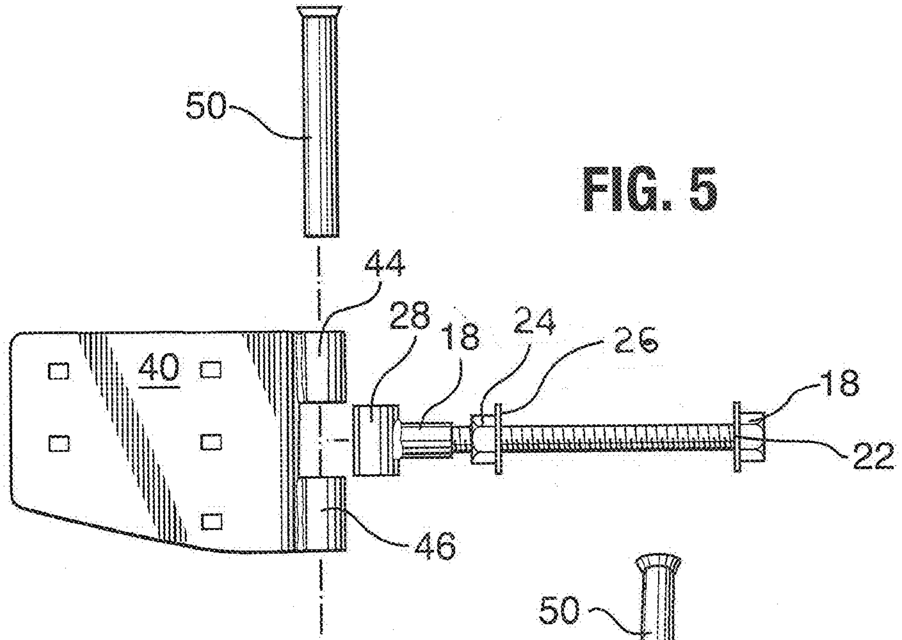
FIG. 5 is an exploded view showing a threaded tee rod having an end sleeve and a pair of spaced apart nuts and washers, aligned for insertion between an upper and lower sleeve of the U-shaped bracket for cooperative engagement with a flanged hinge bolt for holding the sleeves of the threaded tee bolt and U-shaped bracket together in a pivotal arrangement.
Figure 6:
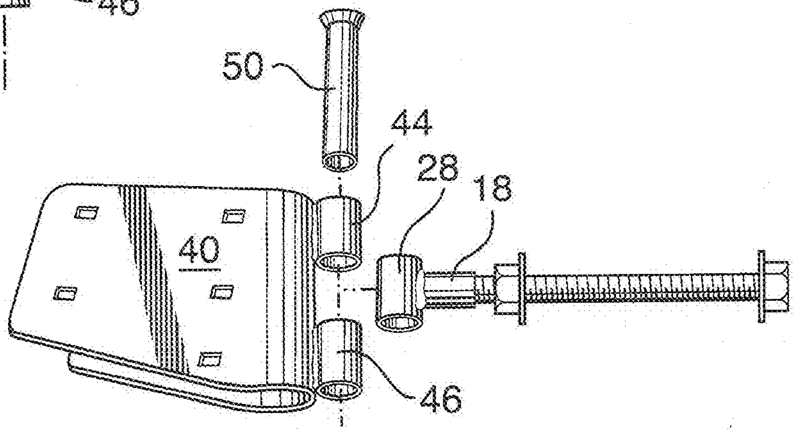
FIG. 6 is an exploded view of the U-shaped bracket and threaded bolt of FIG. 5 showing the upward taper of the lower portion of the edges of the flanges extending from the bottom aperture.
Figure 7:
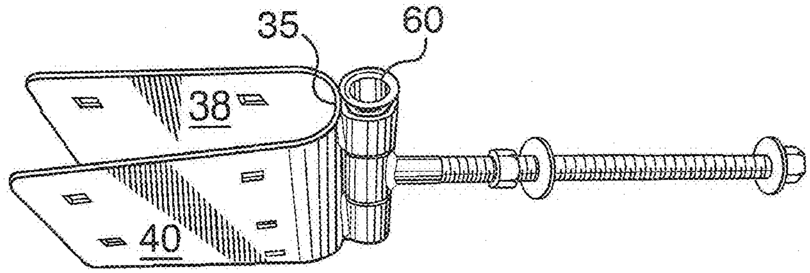
FIG. 7 is a perspective view showing the assembled U-shaped bracket having a flared hinge bolt and threaded tee rod with washers and nuts.
Figure 8:
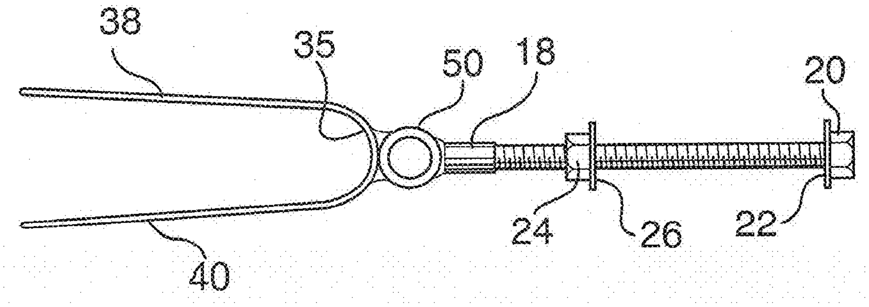
FIG. 8 is a top view showing the assembled U-shaped bracket having a flared hinge bolt and threaded tee rod with washers and nuts.

The threaded tee rod 18 includes at least one nut 20 and washer 22 on the back side of the post opposite the gate and at least one nut 24 and optional washer 26 on the side of the post adjacent the gate 6 for adjustably holding a U-shaped bracket 10 a selected distance from the post at a selected height. A vertically oriented rod tee 28 is affixed to a distal end of a threaded tee rod 18 as shown in FIGS. 1 and 8 by molding, welding or other suitable means. The threaded tee rod 18 is typically about eight to twelve inches long or a sufficient length to extend through both sides of the mounting post. In one preferred embodiment, the threaded tee rod 18 is 14 inches long and ¾ of an inch in diameter. As shown in FIGS. 5-6 and 8, the rod tee comprises a short vertical sleeve portion 28 which is aligned with and disposed between the bracket sleeves and includes a perpendicular intersecting medial portion 21 affixed to the threaded tee rod 18 by welding or being molded integrally therewith defining a tee sleeve 28 for holding the threaded tee rod to the U-shaped bracket.

The U-shaped bracket 30 is formed from a single integral piece of material having a plurality of apertures 34 therein. One preferred embodiment includes a lower edge tapered from the center outward toward the ends. The U-shaped bracket is bent or more particularly formed having a parabolic curve in the center to cooperatively engage a tubular end post member 12 of a gate 6 in the center forming a U-shaped bend portion 35 wherein the curved portion typically will be contiguous with a 2-3 inch tubular member such as a gate end post 12 abutted there against. Upon bending, the distal ends 36 of the U-shaped bracket form a pair of spaced apart opposing aligned side flanges 38, 40 with the plurality of apertures 34 aligned for insertion of fastening bolts 42 with nuts extending therethrough which can be tightened to draw the flanges 38, 40 tightly together around a horizontal gate member 8. In a preferred embodiment the U-shaped bracket flanges 38 and 42 are flared or spread apart prior to being affixed to a gate longitudinal member to facilitate an easy fit. The U-shaped bracket 30 includes a pair of spaced apart bracket sleeves, an upper bracket sleeve 44 and lower bracket sleeve 46, vertically aligned with one another welded onto and extending from an outer surface 48 of the U-shaped bracket's exterior curved portion 35. A holding member 50 such as a pin, bolt, or pipe is inserted through the aligned bracket sleeves 44, 46, and bolt sleeve 28 to hold the U-shaped bracket 30 and gate 6 affixed thereto to the threaded bolt 16 supported by the post. 14.

More particularly in one preferred embodiment, the U-shaped bracket 30 is formed form 11 gauge plate steel with ⅜ inch square holes for cooperatively engaging with ⅜"×3" carriage bolts. The U-shaped bracket 30 is sized for receiving 1 and ¼ inch tubing. The holding member or bolt 50 comprises a 1 inch steel pin with flat washer weld on top. An optional holding member comprises a longitudinal pipe tapered at the top to hold the aligned bracket sleeves 44, 46, and bolt sleeve 28 to hold the U-shaped bracket 30 and gate 6 affixed thereto to the threaded tee rod 18 supported by the post 14. The flared top 60 provides a self adjusting holding member.

The U-shaped bracket 30 comprises opposing side flanges formed having a plurality of spaced apart apertures 34 formed therein by pressing or drilled therein. A preferred embodiment uses square apertures to cooperatively engage carriage bolts. The U-shaped bracket is bent in the center forming a U-shaped bracket 30 so that the apertures 34 formed therein are in opposing alignment and the ends of the bracket form spaced apart aligned flanges 38 and 40 opposing one another above and below the horizontal tube member for receiving a portion of a horizontal longitudinal member joined to a portion of a vertical end member of a gate frame. By affixing the U-shaped bracket to a horizontal member and vertical end post member of the gate and abutting the vertical leg member of the gate against the curved interior surface of the U-shaped bracket, the weight of the gate is distributed over both members rather than just the end post. Moreover, the use of a top and bottom U-shaped bracket distributes the gate weight over three gate frame members rather than the one gate end post frame member typically used in conventional gates.

The U-shaped bracket 30 includes a pair of spaced apart vertically aligned sleeves 44, 46 affixed to an outside surface 48 of the U-shaped bracket 30. The top sleeve 44 and the bottom sleeve 46 extend from the closed end portion and are attached by welding or other means. The flanges 38, 40 are spaced apart a selected distance by forming a parabolic curve in the U-shaped bracket of approximate thickness of a vertical leg member 12 and or horizontal member 8 of a gate 6 which would cooperatively be disposed therebetween. A preferred embodiment includes a pair of spaced apart bottom apertures 52, four spaced apart center apertures 54, and four spaced apart top apertures 34 disposed near the bent portion of the bracket. The width of the mounting bracket is sized so that a horizontal bar 8 of the gate 6 will be aligned between the top 34 apertures and center apertures 54. The top 34, center 54, and bottom apertures 52 are vertically aligned adjacent to the outer vertical gate leg 12 for lateral support. The top sleeve 44 is horizontally aligned with top aperture 34, the center aperture 54 is aligned with the tee sleeve 28, and the bottom aperture 52 are aligned with the bottom sleeve 46. Bolts such as carriage bolts are used to fasten the mounting bracket to the gate. Mounting the gate to the post simply requires aligning the sleeves of the gate mounting bracket with the sleeve extending from the hinge bolt and inserting a bolt thorough the cooperatively engaging sleeves to hold the mounting bracket to the post.

It is contemplated and will be clear to those skilled in the art that modifications and/or changes may be made to the embodiments of the disclosure. Accordingly, the foregoing description and the accompanying drawings are intended to be illustrative of the example embodiments only and not limiting thereto, in which the true spirit and scope of the present disclosure is determined by reference to the appended claims.

I claim:

1. An improved gate hinge bracket assembly for pivotally mounting a gate having longitudinal horizontal members and a leg frame member to a vertical support such as a post, the improvement comprising:

a pair of U-shaped brackets including a first U-shaped bracket and a second U-shaped bracket, each U-shaped bracket having opposing side flanges configured to receive a horizontal bar and a vertical leg frame member disposed therebetween adjacent an inner surface of said U-shaped bracket, said opposing side flanges of each U-shaped bracket including a plurality of spaced apart aligned apertures for insertion of screws or bolts surrounding the horizontal bar and vertical leg member for attachment thereto;

each of said first and second U-shaped brackets further comprising a pair of spaced apart aligned vertical bracket sleeves affixed to an outer surface of said U-shaped bracket opposite said opposing side flanges;

a threaded tee rod including a pair of nuts and washers for securing said threaded tee rod to said post, said threaded tee rod having a proximal end including a vertical tee rod sleeve alignable for cooperative engagement between said bracket sleeves; and a vertical pin extending through said bracket sleeves and said vertical tee rod sleeve to pivotally connect and support said gate to said post.

2. The gate hinge bracket assembly of claim 1, wherein said threaded tee rod extends through a horizontal bore formed in the post.

3. The gate hinge bracket assembly of claim 1, wherein said U-shaped bracket is formed from a single piece of bent metal plate.

4. The gate hinge bracket assembly of claim 1, wherein said bracket sleeves are welded to an outer surface of said U-shaped bracket.

5. The gate hinge bracket assembly of claim 1, wherein said U-shaped bracket is formed from a single sheet of material having a wider center section with tapered opposing side flanges.

6. An improved gate hinge bracket assembly for pivotally mounting a gate having at least one longitudinal horizontal member and a vertical frame member to a vertical support such as a post, the improvement comprising:

a single U-shaped bracket having opposing side flanges configured to receive said longitudinal horizontal member and a vertical leg frame member disposed therebetween adjacent an inner surface of said U-shaped bracket, said opposing side flanges including a plurality of spaced apart aligned apertures for receiving fasteners securing said U-shaped bracket to said horizontal member and said vertical frame member;

a pair of spaced apart vertically aligned bracket sleeves affixed to an outer surface of said U-shaped bracket opposite said opposing side flanges;

a threaded tee rod configured for attachment to said post and including at least one nut and washer for securing said threaded tee rod to said post, said threaded tee rod having a proximal end including a vertically oriented tee rod sleeve alignable with said bracket sleeves; and a pin or bolt extending through said bracket sleeves and said tee rod sleeve to pivotally connect said U-shaped bracket, and said gate secured thereto, to said post.

7. The gate hinge bracket assembly of claim 6, wherein said U-shaped bracket is configured to be used as either an upper hinge bracket or a lower hinge bracket of said gate.

8. The gate hinge bracket assembly of claim 6, wherein said U-shaped bracket is formed from a single piece of bent metal plate.

9. The gate hinge bracket assembly of claim 6, wherein said bracket sleeves are welded to an outer surface of said U-shaped bracket.

10. The gate hinge bracket assembly of claim 6, wherein said threaded tee rod extends through a horizontal bore formed in said post.

11. The gate hinge bracket assembly of claim 6, wherein said U-shaped bracket is formed from a single sheet of material having a wider center section with tapered opposing side flanges.

12. The gate hinge bracket assembly of claim 6, wherein at least a pair of U-shaped brackets are mounted in vertically spaced relation on said gate to support said gate on said post.

13. The gate hinge bracket assembly of claim 12, wherein said pair of U-shaped brackets comprises a first upper U-shaped bracket and a second lower U-shaped bracket configured to be spaced vertically from each other on said gate, wherein said first upper U-shaped bracket and said second lower U-shaped bracket is pivotally connected to said post by a corresponding threaded tee rod, such that said gate is supported by a first upper hinge bracket assembly and a second lower hinge bracket assembly.

* * * * *